United States Patent

Adams et al.

[11] Patent Number: 5,806,959
[45] Date of Patent: Sep. 15, 1998

[54] ILLUMINATED SKATE ROLLER

[76] Inventors: Marvin Adams, 4775 Miramon, Atascadero, Calif. 93422; Scott Ganaja, 1232 Descanso Dr., San Luis Obispo, Calif. 93405

[21] Appl. No.: 821,005

[22] Filed: Mar. 20, 1997

Related U.S. Application Data

[63] Continuation-in-part of Ser. No. 673,644, Jun. 25, 1996, abandoned.

[51] Int. Cl.[6] ................................................ B60Q 1/26
[52] U.S. Cl. ..................... 362/78; 362/802; 362/234; 362/811; 280/811; 280/11.19
[58] Field of Search ................................. 362/61, 78, 234, 362/103, 35, 800, 806, 253, 802, 811; 280/809, 811, 11.22, 11.19, 816; 301/5.7, 5.3

[56] References Cited

U.S. PATENT DOCUMENTS

| | | | |
|---|---|---|---|
| 4,298,910 | 11/1981 | Price | 362/35 |
| 4,363,502 | 12/1982 | Bakerman | 280/816 |
| 4,367,515 | 1/1983 | Beard | 362/103 |
| 4,383,244 | 5/1983 | Knauff | 340/321 |
| 5,278,733 | 1/1994 | St. Thomas | 362/78 |
| 5,456,478 | 10/1995 | Hsu et al. | 280/11.22 |
| 5,475,572 | 12/1995 | Tseng | 362/78 |

*Primary Examiner*—Thomas M. Sember
*Attorney, Agent, or Firm*—Gene Scott-Patent Law & Venture Group

[57] ABSTRACT

A roller for a roller skate is made of a light transmitting material. The roller includes an electrical circuit for emitting a light from within the roller. The entire roller is thereby illuminated by the circuit and appears, itself, to be a light source. A flat peripheral edge of the roller is particularly brightly illuminated. The light source or the roller, or both may be colored to produce a color or color combination of choice.

12 Claims, 6 Drawing Sheets

5,806,959

ILLUMINATED SKATE ROLLER

This application is a file wrapper continuation in part of U.S. patent application Ser. No. 08/673,644 filed on Jun. 25, 1996 now abandoned.

BACKGROUND OF THE INVENTION

1. Field of the Invention

This invention relates generally to skate rollers, and more particularly to a skate roller having a means for illumination thereof.

2. Description of Related Art

Invention and use of devices in the field of the invention is known to the public, as they are used for the intended purposes as defined herein. The following art defines the state of this field at this time:

Tseng, U.S. Pat. No. 5,475,572 discloses a light emitting roller for roller skates, including a roller body having a center axle hole for mounting on a wheel axle, an annular groove around the center axle hole at an outer side, a battery chamber and two opposite through holes at the annular groove; an annular circuit board mounted within the annular groove on the roller, having a plurality of light emitting elements controlled to emit light through the through holes on the roller body, an automatic switch, an opening, two contact metal plates at two opposite sides of the opening, and a battery cell connected between the contact metal plates and mounted within the battery chamber on the roller to provide electric power supply to the light emitting elements through the automatic switch; and an annular cap mounted within the annular groove.

Hsu et al., U.S. Pat. No. 5,456,478 discloses a roller skating shoe with a light emitting device which includes an elongated inverted U-shaped plate fixed under a skating shoe, a plurality of rollers combined rotatably with the elongated inverted U-shaped plate by means of two locating plates and bearings, and rod shafts passing through the inverted U-shaped plate, the locating plates, and the rollers to be tightly screwed with anti-loose nuts. Coils are electrically connected with light emitters fixed on both sides of each roller. Magnets are fixed on the two locating plates producing magnetism to cross each coil to allow the coil to produce electricity to light up each emitter when the rollers are rotated by a skater.

St. Thomas, U.S. Pat. No. 5,278,733 discloses a decorative lighting apparatus for connection to a roller skate wheel and axle supporting the wheel which includes a unitary housing which is positioned about the axle and brought into frictional engagement with the wheel. A battery operated light bulb is connected to the housing, and the housing and bulb rotate with the skate wheel about the axle.

Knauff, U.S. Pat. No. 4,383,244 teaches intensified light emitting diodes intermittently energized while in motion, the light emission being sensed by eyesight retention as dots and bars of light dynamically related and intermixed relative one to the other in an infinite number of geometric patterns dependent upon the simple and compound application of rectilinear, arcuate and rotary motion in combination with the frequency, spacing and duration of pulse application by a flasher circuit modified by adjustment both manually and automatically.

Beard, U.S. Pat. No. 4,367,515 discloses a roller skate attachment operable to be fitted onto a roller skate having a shoe upper, a sole, a running gear attached to the sole and a toe stop releasably connected to a forward portion of the running gear. The attachment comprises a plurality of light emitting diodes releasably connected to the toe stop. A battery is operably mounted on the roller skate and an electrical circuit selectively interconnects the battery and the light emitting diodes to selectively light the diodes.

Bakerman, U.S. Pat. No. 4,363,502 discloses a skate wheel which has a wheel rotatably mounted on an axle with a light emitting element mounted on the wheel for making the wheel illuminative when an electrical potential is applied to the light emitting element. The electrical potential can be supplied by a battery installed within the wheel through a switch which can be actuated by rotating a cap movably mounted on the hub of the wheel or contacts actuated by centrifugal force upon rotation of the wheel. The rotor and stator of an electrical generator can be mounted on the axle and wheel to generate the electrical potential in an embodiment which does not require a battery.

Price, U.S. Pat. No. 4,298,910 teaches a roller skate wheel which has an inner body portion for securement to the axle of the roller skate and an outer body rotatable about the inner body on appropriate bearings. A permanent magnet is secured to the inner body in flux coupling relationship with electrically conducting windings carried on the outer body. When the wheel rotates, electricity is generated on the windings and used to energize light emitting diodes carried on the outer body of the wheels. The generated electricity is of the alternating type and since the light emitting diodes are essentially polarity-sensitive, they will be energized on only positive half cycles of the current to provide a flashing or stroboscopic effect.

Thus it is shown in the prior art that a skate roller may be particularly enhanced by adding lighting effects to the roller. However, the prior art does not teach that the entire roller itself may be illuminated and not just point sources of light. The present invention provides for this capacity and provides further related advantages as described in the following summary.

SUMMARY OF THE INVENTION

The present invention teaches certain benefits in construction and use which give rise to the following objectives described below.

A roller for a roller skate is made of a light transmitting material. The roller includes an electrical circuit for emitting a light from within the roller. The entire roller is thereby illuminated by the circuit and appears, itself, to be a light source. A flat peripheral edge of the roller is particularly brightly illuminated. The light source or the roller, or both may be colored to produce a color or color combination of choice. A manual switch is used to set the circuit operational, and an inertial switch is made by the spinning of the roller to energize the light source. Thus it is an object of the present invention to provide a roller wheel that is fully illuminated when in use. It is another object to provide a means by which the color of the roller may be selected by using illumination means of a chosen color. It is a final object to provide such a roller that is shaped so as to provide a color stripe at the peripheral edge of the roller, the flat stripe emitting a bright glow.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
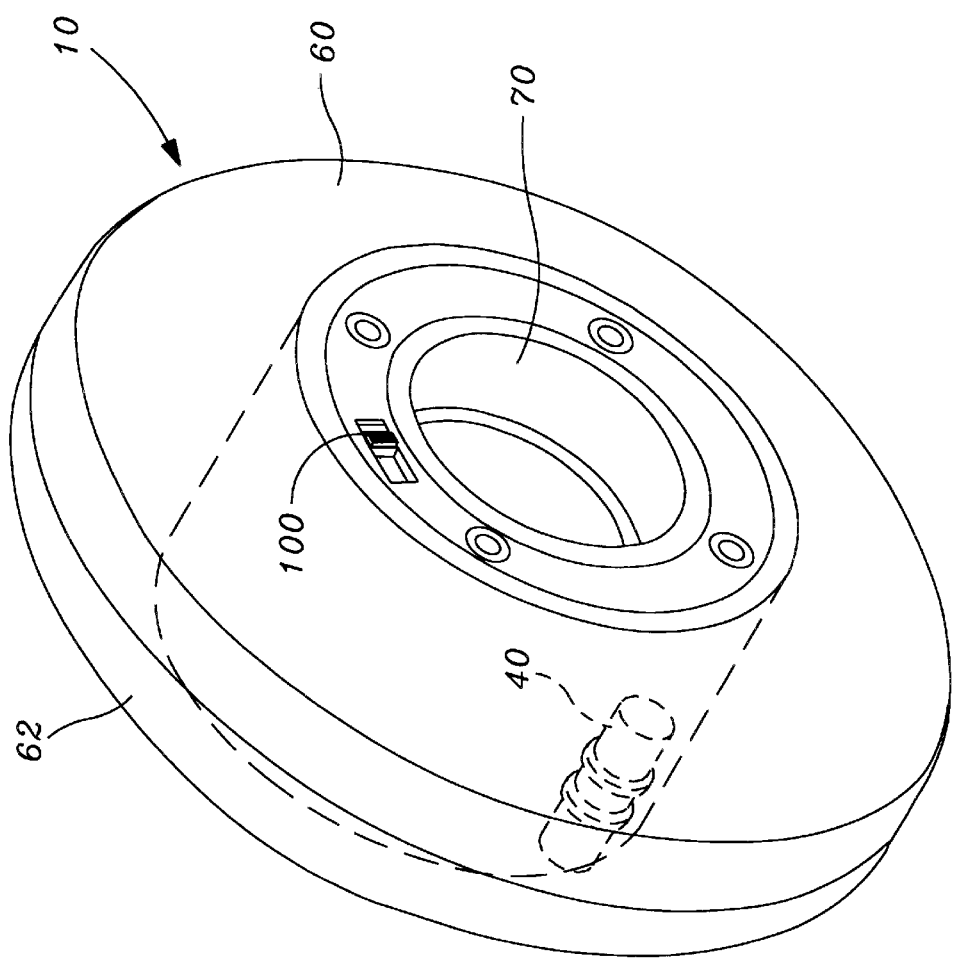
FIG. 1 is a perspective view of the preferred embodiment of the present invention.
Figure 2:
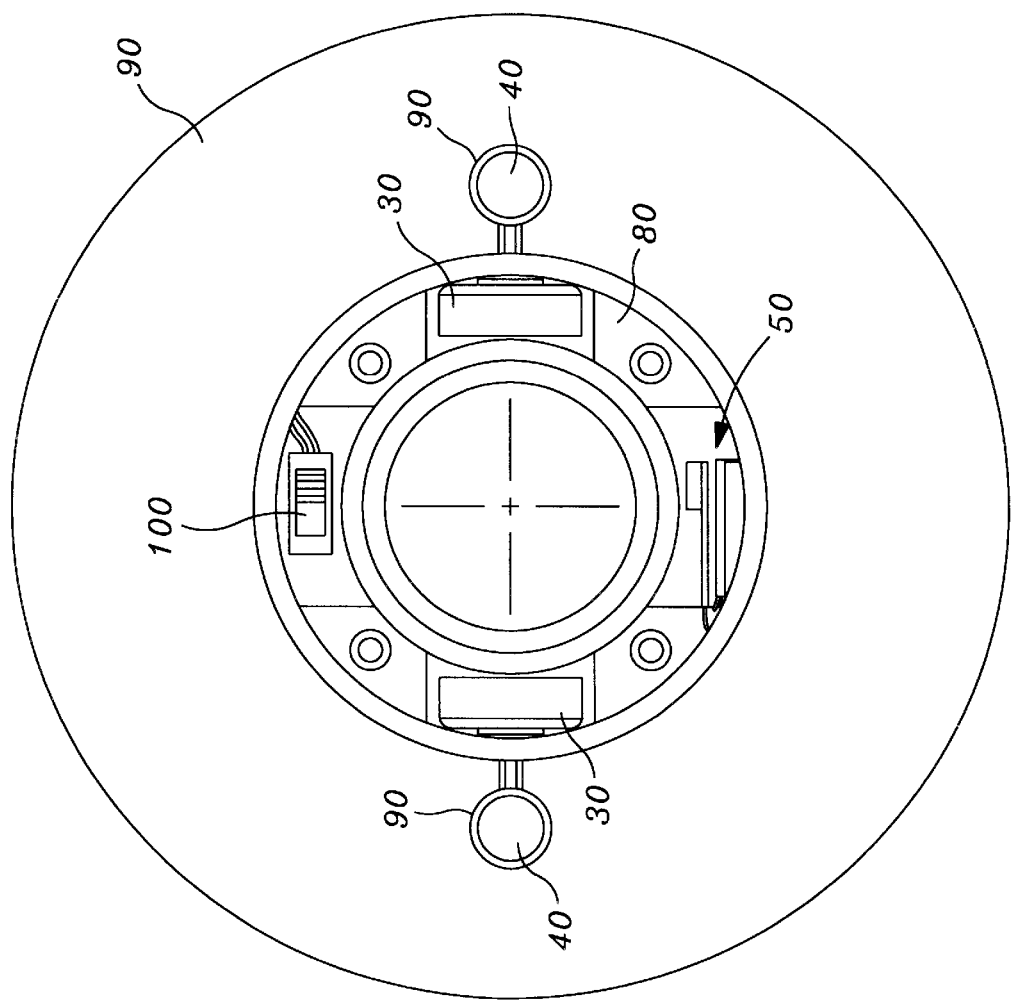
FIG. 2 is a front elevational view thereof, with a cover plate of the invention removed to show the interior constructional detail of the invention.

The above described drawing figures illustrate the invention, a light emitting roller 10 for roller skates. The roller 10 includes an electrical circuit 20 having a means for producing an electrical current 30, such a battery, a means for converting the electrical current into light energy and for emitting the light energy 40, such as a light emitting diode, a means for inertial switching 50, such as a mercury switch, or a cantelevered contactor, the later shown in FIG. 2. The electrical current producing means 30, the light energy converting and emitting means 40, and the inertial switching means 50, are interconnected so that with the inertial switching means 50 made, i.e., in the "on" state, light energy is emitted from the light energy converting and emitting means 40. A roller body 60 provides a center axle hole 70 for rotatably mounting the roller body 60 on a roller axle (not shown) such as on a roller skate (not shown). An annular groove 80 around the center axle hole 70 is used to mount the electrical current producing means 30 and the inertial switching means 50. An aperture means 90 is used to mount the converting and emitting means 40.

The roller body 60 is constructed of a light transmitting material such as a clear polyurethane resin, and the aperture means is positioned such that a portion, or, the entire roller body 60 is illuminated from within, when the converting and emitting means 40 is energized. Rotation of the roller body 60 about the roller axle provides an inertial force for making the inertial switching means 50 and to thereby provide for illumination of the roller body 60. Preferably, the roller body 60 provides a flat annular peripheral edge 62 which, because it is flat, is illuminated uniformly across its width, and thus appears as a bright circular stripe around the roller body 60. Other surfaces may be frosted or textured to provide additional illumination. The light transmitting material of the roller body 60 may be colored. The converting and emitting means 40 may then be selected to produce a white light. In this configuration, the roller body 60 when illuminated, provides a glowing appearance in the color of the roller body itself 60. Alternately, the roller body 60 may be milky or colorless and the converting and emitting means 40 may then be selected to produce a colored light. In this case, the roller body 60 when illuminated, provides a glowing appearance in the color of the colored light. In a hybrid alternative, the light transmitting material of the roller body 60 may be colored in a first color, the converting and emitting means 40 producing a colored light in a second color. In this case, the roller body 60 when illuminated, provides a glowing appearance in a third color, the third color being the natural combination of the first and second color.

Figure 4:
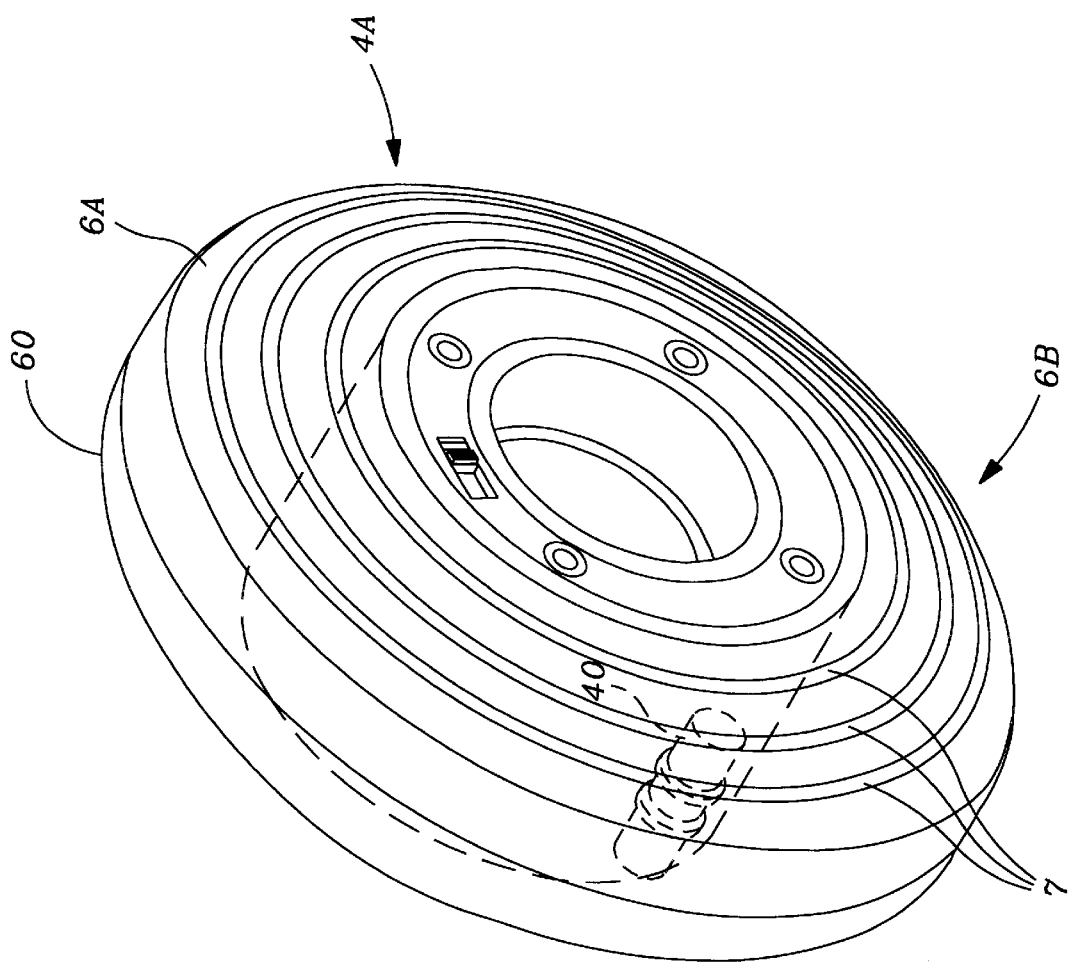
FIGS. 4–6 are identical to FIG. 1 with added means for a lighting effect as a surface characteristic on the present invention.
Figure 5:
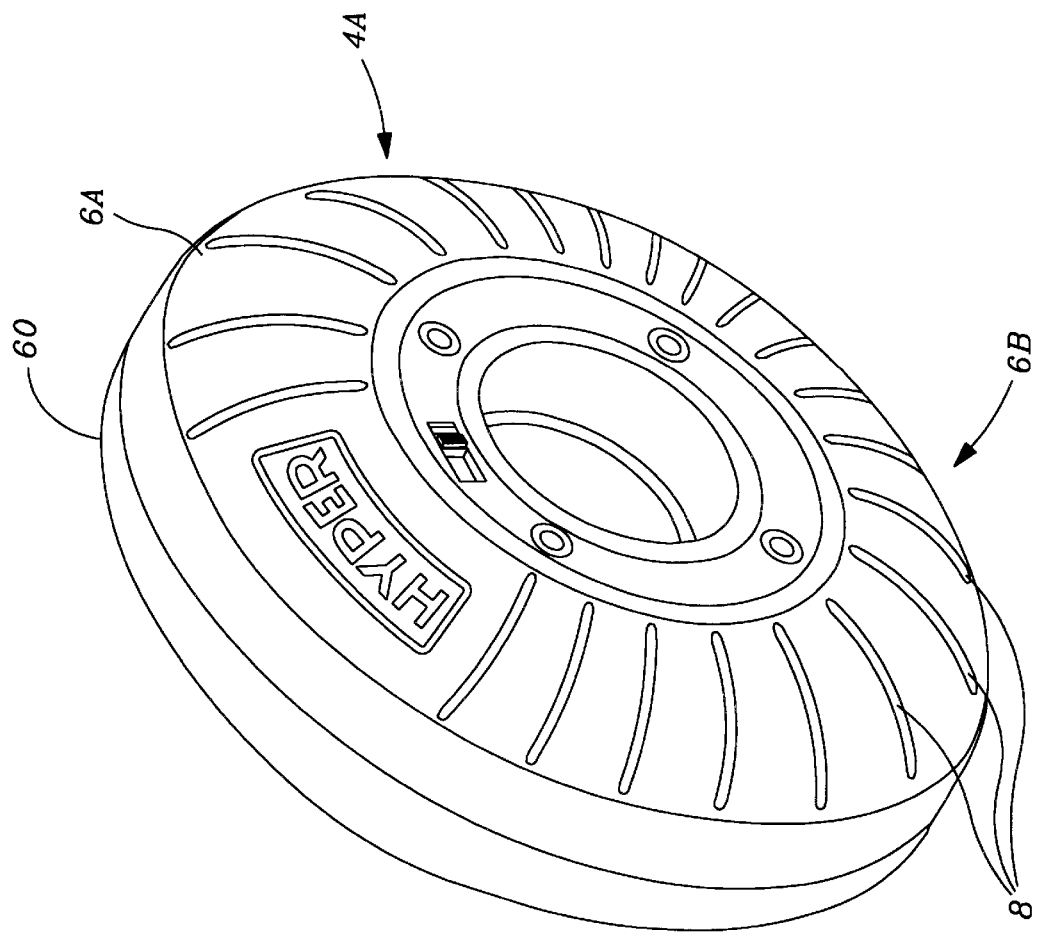
Figure 6:
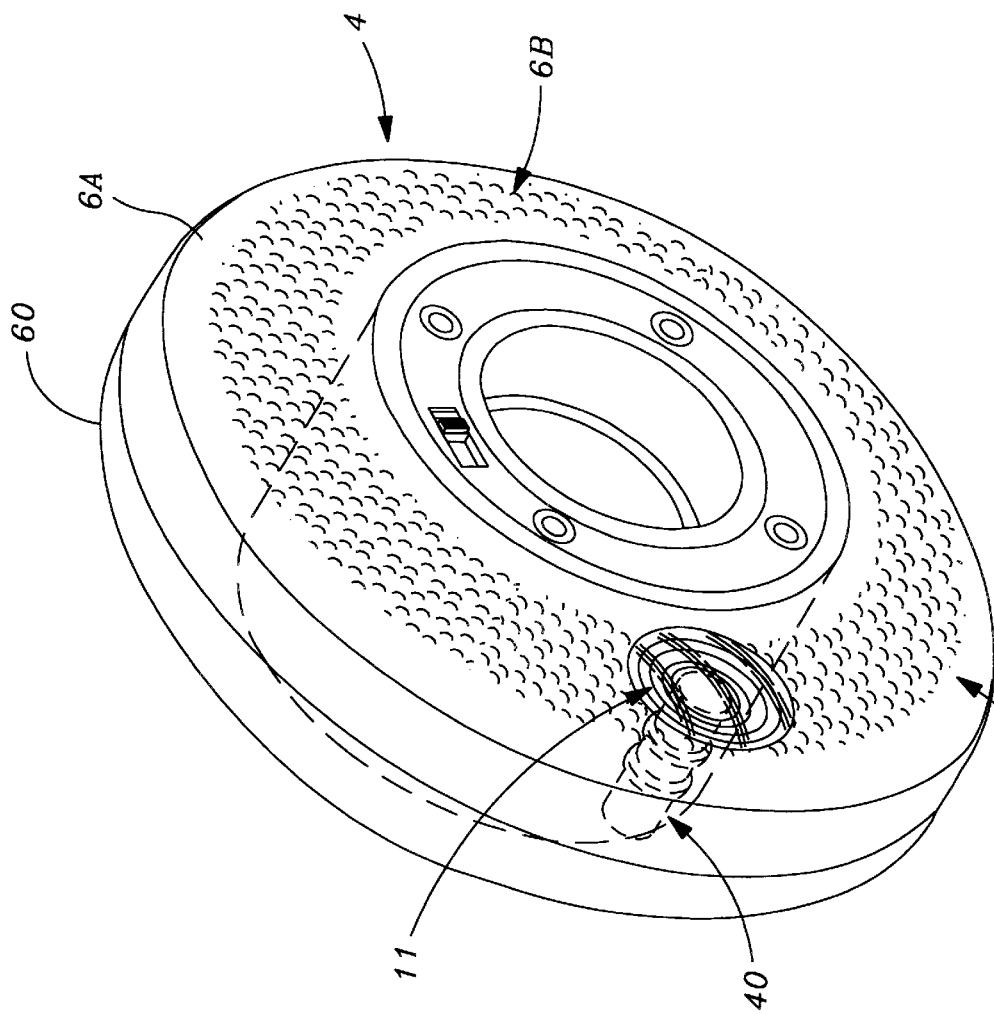
Figure 7:
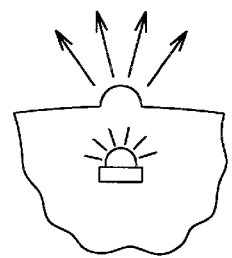
FIG. 7 is a partial sectional view of the roller body of the invention showing a lighting effect therein.

Referring now to FIGS. 4–7, the roller body 60 provides a sidewall 6A. The sidewall 6A provides a means for concentrating 4 the light for producing a lighting effect 6B. This preferably takes the form of a series of concentrically positioned circular grooves or ridges 7 as shown in FIG. 4, the grooves or ridges being of a shape for forming the light concentrating means 4A. Alternately, the sidewall may have a series of radially positioned grooves or ridges 8, as shown in FIG. 5, of a shape for forming the light concentrating means 4B. Another preferred embodiment includes the sidewall having at least one portion formed with a non-smooth texture 9, as shown in FIG. 6, for forming the light concentrating means 4C at the non-smooth texture 9 for producing the lighting effect 6B. Finally, the sidewall 6A may have at least one portion, adjacent the converting and emitting means, formed as an optical lens contour 11 such as a convex, concave or Fresnel lens surface contour, as shown in FIG. 6, for forming the light concentrating means 4 for producing the lighting effect 6B. Such a Fresnel lens surface contour 11 may be formed as a series of depressions or as a series of ridges in the sidewall 6 of the roller body 60, where the manner of making such a contour 11 is well known in the field of Optics. FIG. 7 shows the manner in which either a depression or a ridge on the surface of a material produces a concentration of light to a viewer, when the light source is buried within the material. The grooves, ridges and other local upsets in the generally smooth contour of the roller body 60 appear relatively bright as compared with the overall illumination of the sidewall 6A (wheel tire). By definition, then, the lighting effect 6B is the general visual result of the overall illuminated sidewall 6A, plus one of the local upsets defined above or any other such surface contour upset in keeping with the general approach defined herein. Of particular interest is the use of an groove or ridge set in the form of a logo, trademark, or other commercial insignia as shown in FIG. 5, as reference numeral 12.

The electrical circuit 20 preferably further includes a means for manual switching 100 of the electrical current in the electrical circuit 20. The manual switching means 100 is preferably in series electrical connection with the inertial switching means 50 such that both switching means 50, 100 must be made in order to energize the circuit.

In operation, the manual switch 100 is closed prior to use of the roller 10. As roller 10 starts to spin, inertial switch 50 closes due to centripetal force and the circuit 20 is made. In the preferred embodiment 3 VDC are placed across four light emitting diodes, LED's 40. Other light source types and configurations may be used while supporting the claims of the invention.

Figure 3:
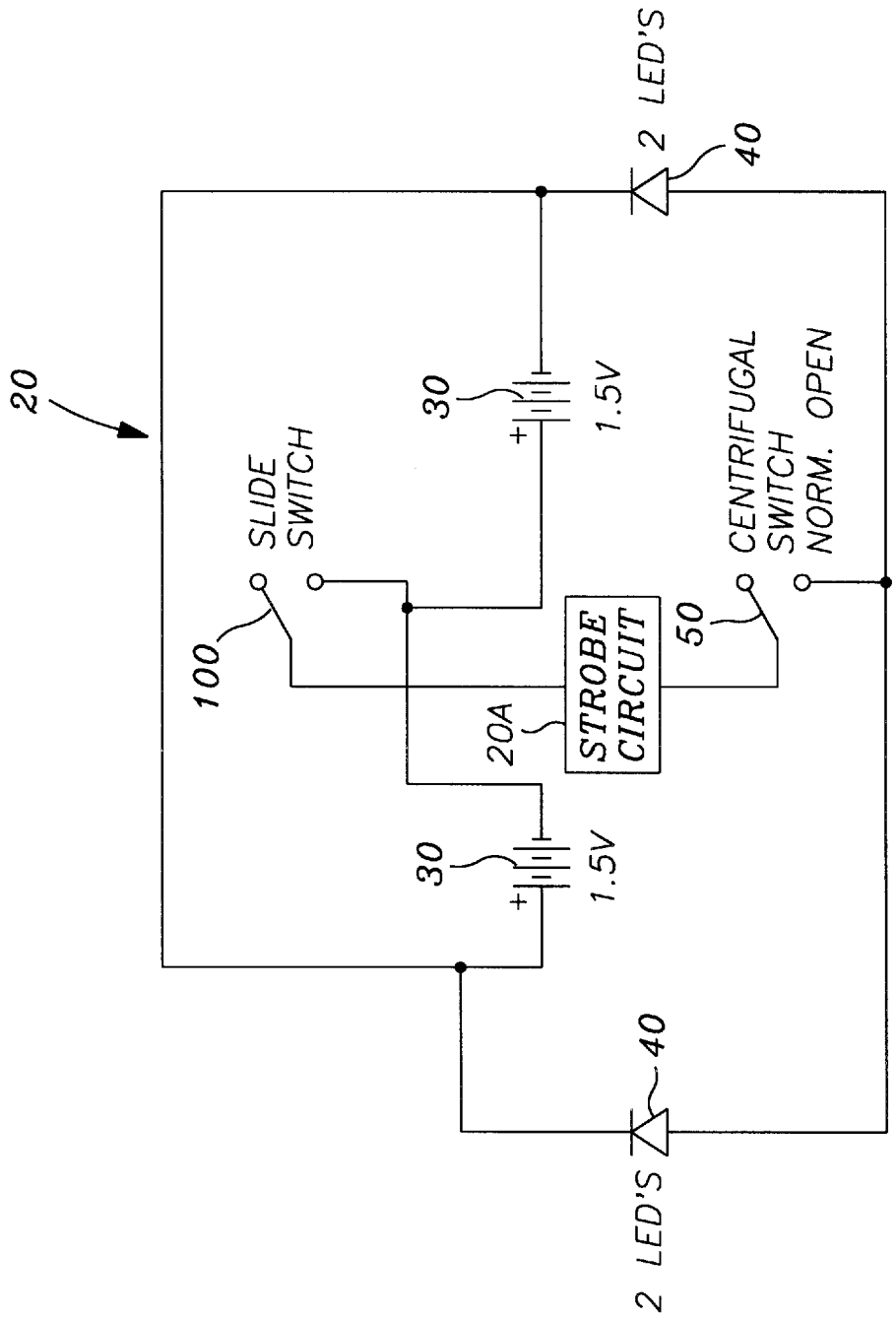
FIG. 3 is an electrical schematic diagram of a circuit of the invention.

Preferably a strobe circuit 20A is interconnected with the electrical circuit 20, as shown in FIG. 3, the strobe circuit 20A enabling the converting and emitting means 40 to emit the light in pulses at such a frequency that with the roller 10 rotating at a selected speed, the roller body 60 appears to be stationary, rotating forward slowly, or rotating backward slowly, or any other optical illusion. Preferably the roller body 60 provides a means for concentrating 110 the light for producing a lighting effect 6B. The frequency of the pulses as enabled by the strobe circuit 20A, which may be any well known circuit for producing a strobe effect, is preferably between approximately 28 Hz and 56 Hz so that the stationary appearance occurs with the roller 10 rotating at approximately 5 miles per hour, a typical speed for a skater. Alternately, and preferably, the strobe circuit 20A includes a means for enabling the light pulses in coordination with the rotation of the roller 10 such as an orientation switch such as a mercury switch. Such an enhanced strobe circuit 20A then pulses the light at a frequency to correspond with rotation so that the light effect appears to be stationary at all rotational speeds of the roller. In this embodiment, the logo 12 shown in FIG. 5 would appear brightly lit and stationary at all rotational speeds of the roller 10, and therefore readable.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A light emitting roller for roller skates, comprising;
   an electrical circuit including:
   a means for producing an electrical current in the electrical circuit;
   a means for converting the electrical current into light energy and for emitting the light energy;
   a means for inertial switching of the electrical current in the electrical circuit;
   the electrical current producing means, the light energy converting and emitting means, and the inertial switching means, interconnected so that with the inertial switching means made, light energy is emitted from the light energy converting and emitting means;
   a roller body providing a center axle hole for rotatably mounting the roller body on a roller axle, an annular groove around the center axle hole, the electrical current producing means and the inertial switching means being mounted in the annular groove, and an aperture means, the converting and emitting means being mounted in the aperture means;
   the roller body being constructed of a light transmitting material, the aperture means positioned such that at least a portion of the roller body is illuminated when the converting and emitting means is energized, rotation of the roller body about the roller axle providing an inertial force for making the inertial switching means;
   the roller body providing a means for concentrating the light for producing a visual lighting effect on the roller body, the lighting effect appearing as concentrations of light in a specified pattern on the roller body;
   a strobe circuit interconnected with the electrical circuit, the strobe circuit enabling the converting and emitting means to emit the light in pulses at such a frequency that the roller appears to be rotating at a rate different from an actual rate of rotation of the roller.

2. The roller of claim 1 wherein the light transmitting material of the roller body is colored, the converting and emitting means producing a white light, the roller body when illuminated, providing a glowing appearance in the color of the roller body.

3. The roller of claim 1 wherein the light transmitting material of the roller body is white, the converting and emitting means producing a colored light, the roller body when illuminated, providing a glowing appearance in the color of the colored light.

4. The roller of claim 1 wherein the light transmitting material of the roller body is colored in a first color, the converting and emitting means producing a colored light in a second color, the roller body when illuminated, providing a glowing appearance in a third color, the third color being the natural combination of the first and second color.

5. The roller of claim 1 wherein the frequency of the pulses is between approximately 28 Hz and 56 Hz so that the roller appears stationary with the roller rotating at a typical roller skating speed.

6. The roller of claim I wherein the roller body provides a sidewall, the means for concentrating the light being a series of concentrically positioned circular grooves on the sidewall.

7. The roller of claim 1 wherein the roller body provides a sidewall, the means for concentrating the light being a series of concentrically positioned circular ridges on the sidewall.

8. The roller of claim 1 wherein the roller body provides a sidewall, the means for concentrating the light being a series of radially positioned grooves on the sidewall.

9. The roller of claim 1 wherein the roller body provides a sidewall, the means for concentrating the light being a series of radially positioned ridges on the sidewall.

10. The roller of claim 1 wherein the roller body provides a sidewall, the means for concentrating the light being a non-smooth texture on the sidewall.

11. The roller of claim 1 wherein the roller body provides a sidewall, the means for concentrating the light being an optical lens formed in the sidewall.

12. The roller of claim 1 wherein the strobe circuit further includes a means for sensing rotational orientation of the roller, the strobe circuit thereby enabling the light pulses in synchronization with rotation of the roller so as to enable the visual lighting effect to appear as non-rotating at all rotational speeds of the roller.

* * * * *